(12) United States Patent
Reisdorf et al.

(10) Patent No.: US 8,511,006 B2
(45) Date of Patent: Aug. 20, 2013

(54) BUILDING-INTEGRATED SOLAR-PANEL ROOF ELEMENT SYSTEMS

(75) Inventors: Raymond Joseph Reisdorf, Attert (BE); Bryan Morris, Geneva (CH)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 12/818,504

(22) Filed: Jun. 18, 2010

(65) Prior Publication Data

US 2011/0138710 A1 Jun. 16, 2011

Related U.S. Application Data

(60) Provisional application No. 61/222,516, filed on Jul. 2, 2009.

(51) Int. Cl.
*E04H 14/00* (2006.01)
*E04D 13/18* (2006.01)

(52) U.S. Cl.
USPC ........................................................ 52/173.3

(58) Field of Classification Search
USPC .................. 52/173.3, 33, 467, 547, 177, 390, 52/656.1, 630; 248/237
See application file for complete search history.

(56) References Cited

U.S. PATENT DOCUMENTS

| | | | |
|---|---|---|---|
| 2,005,335 A | 6/1935 | Clough |
| 2,018,722 A | 10/1935 | Humphrey |
| 2,034,602 A | 3/1936 | Anderson |
| 2,265,540 A | 12/1941 | Nichols |
| 2,284,705 A | 6/1942 | Wickersham |
| 2,378,027 A | 6/1945 | Murray |
| 2,687,701 A | 8/1954 | Abraham |
| 3,184,324 A | 5/1965 | Ryckman |
| 3,624,975 A | 12/1971 | Morgan et al. |
| 3,919,823 A | 11/1975 | Bradley |
| 4,321,416 A | 3/1982 | Tennant |
| 4,333,279 A | 6/1982 | Corbin et al. |
| 4,468,909 A | 9/1984 | Eaton |
| 4,527,374 A | 7/1985 | Corbin |
| 4,860,509 A | 8/1989 | Laaly et al. |
| 4,886,554 A | 12/1989 | Woodring et al. |

(Continued)

FOREIGN PATENT DOCUMENTS

| | | |
|---|---|---|
| CN | 101828268 | 9/2010 |
| CN | 101922211 | 12/2010 |

(Continued)

OTHER PUBLICATIONS

Bailey et al., "Long Term Field Teest Results of Experimental EPDM and PUF Roofing", US Army Corps of Engineers, USACERL Technical Report M-90/09, Apr. 1990, 51 pgs.

(Continued)

*Primary Examiner* — Brian Glessner
*Assistant Examiner* — Paola Agudelo
(74) *Attorney, Agent, or Firm* — Calfee, Halter & Griswold LLP

(57) ABSTRACT

The present invention provides a building-integrated solar-panel roof element, such as a photovoltaic (BIPV) roof element, adapted to be fitted with a solar panel and integrated in a pitched roof, as well as such a building-integrated roof element fitted with a photovoltaic or solar thermal panel, and an array of these solar energy roof elements mounted on a pitched roof.

17 Claims, 13 Drawing Sheets

(56) References Cited

U.S. PATENT DOCUMENTS

| | | | | |
|---|---|---|---|---|
| 4,900,589 | A | 2/1990 | Montgomery | |
| 4,922,670 | A * | 5/1990 | Naka et al. | 52/126.6 |
| 5,094,058 | A | 3/1992 | Slocum | |
| 5,241,370 | A | 8/1993 | Desor | |
| 5,425,214 | A * | 6/1995 | Truelove et al. | 52/762 |
| 5,437,735 | A | 8/1995 | Younan et al. | |
| 5,505,788 | A | 4/1996 | Dinwoodie | |
| 5,571,596 | A | 11/1996 | Johnson | |
| 5,575,861 | A | 11/1996 | Younan et al. | |
| 5,611,186 | A | 3/1997 | Weaver | |
| 5,813,176 | A | 9/1998 | Tzeng et al. | |
| 5,830,779 | A | 11/1998 | Bressler et al. | |
| 5,986,203 | A | 11/1999 | Hanoka et al. | |
| 5,990,414 | A | 11/1999 | Posnansky | |
| 6,065,256 | A | 5/2000 | Joko et al. | |
| 6,099,779 | A | 8/2000 | Brandner et al. | |
| 6,111,189 | A | 8/2000 | Garvison et al. | |
| 6,182,404 | B1 | 2/2001 | Rinklake et al. | |
| 6,228,785 | B1 | 5/2001 | Miller et al. | |
| 6,232,545 | B1 | 5/2001 | Samaras et al. | |
| 6,311,436 | B1 | 11/2001 | Mimura et al. | |
| 6,360,497 | B1 | 3/2002 | Nakazima et al. | |
| 6,453,629 | B1 | 9/2002 | Nakazima et al. | |
| 6,465,724 | B1 | 10/2002 | Garvison et al. | |
| 6,489,552 | B2 | 12/2002 | Yamawaki et al. | |
| 6,506,970 | B2 | 1/2003 | Yamawaki | |
| 6,519,902 | B1 * | 2/2003 | Scissom | 52/126.4 |
| 6,540,829 | B2 | 4/2003 | Allman et al. | |
| 6,729,081 | B2 | 5/2004 | Nath et al. | |
| 6,730,841 | B2 | 5/2004 | Heckeroth | |
| 6,875,914 | B2 | 4/2005 | Guha et al. | |
| 6,883,290 | B2 | 4/2005 | Dinwoodie | |
| 6,924,015 | B2 | 8/2005 | Zanchetta et al. | |
| 6,933,007 | B2 | 8/2005 | Fensel et al. | |
| 6,959,517 | B2 | 11/2005 | Poddany et al. | |
| 6,959,520 | B2 | 11/2005 | Hartman | |
| RE38,988 | E | 2/2006 | Dinwoodie | |
| 7,012,188 | B2 | 3/2006 | Erling | |
| 7,125,601 | B1 | 10/2006 | Pinault et al. | |
| 7,178,295 | B2 | 2/2007 | Dinwoodie | |
| 7,219,476 | B2 | 5/2007 | Akins et al. | |
| 7,328,534 | B2 | 2/2008 | Dinwoodie | |
| 7,365,266 | B2 | 4/2008 | Heckeroth | |
| 7,387,537 | B1 | 6/2008 | Daily et al. | |
| 7,445,508 | B2 | 11/2008 | Daily et al. | |
| 7,455,899 | B2 | 11/2008 | Gross et al. | |
| 7,487,771 | B1 | 2/2009 | Eiffert et al. | |
| 7,509,775 | B2 | 3/2009 | Flaherty et al. | |
| 7,531,740 | B2 | 5/2009 | Flaherty et al. | |
| 7,557,291 | B2 | 7/2009 | Flaherty et al. | |
| 7,587,864 | B2 | 9/2009 | McCaskill et al. | |
| 7,592,537 | B1 | 9/2009 | West | |
| 7,638,164 | B2 | 12/2009 | Aschenbeck | |
| 7,642,449 | B2 | 1/2010 | Korman et al. | |
| 7,678,990 | B2 | 3/2010 | McCaskill et al. | |
| 7,678,991 | B2 | 3/2010 | McCaskill et al. | |
| 7,713,089 | B2 | 5/2010 | Faust et al. | |
| 7,748,196 | B2 | 7/2010 | Gula et al. | |
| 7,810,286 | B2 | 10/2010 | Eiffert | |
| 7,832,176 | B2 | 11/2010 | McCaskill et al. | |
| 7,858,874 | B2 | 12/2010 | Ruskin et al. | |
| 7,882,677 | B2 | 2/2011 | Jolitz et al. | |
| 7,900,407 | B2 | 3/2011 | Plaisted et al. | |
| 7,926,236 | B2 * | 4/2011 | Konstantin | 52/466 |
| 7,987,641 | B2 | 8/2011 | Cinnamon | |
| 8,003,882 | B2 | 8/2011 | Pisklak et al. | |
| 8,033,857 | B2 | 10/2011 | Nightingale et al. | |
| 8,065,844 | B2 | 11/2011 | Botkin et al. | |
| D653,201 | S * | 1/2012 | Sillett et al. | D13/102 |
| 8,088,990 | B1 | 1/2012 | Tsai et al. | |
| 8,168,880 | B2 | 5/2012 | Jacobs et al. | |
| 8,173,889 | B2 | 5/2012 | Kalkanoglu et al. | |
| 2003/0136073 | A1 * | 7/2003 | Arx et al. | 52/511 |
| 2003/0152747 | A1 | 8/2003 | Fensel et al. | |
| 2003/0154667 | A1 | 8/2003 | Dinwoodie | |
| 2004/0000334 | A1 | 1/2004 | Ressler | |
| 2004/0182032 | A1 | 9/2004 | Koschitzky | |
| 2004/0187909 | A1 | 9/2004 | Sato et al. | |
| 2005/0081909 | A1 | 4/2005 | Paull | |
| 2006/0016136 | A1 * | 1/2006 | Moller | 52/177 |
| 2006/0042680 | A1 | 3/2006 | Korman et al. | |
| 2006/0042682 | A1 | 3/2006 | Wolfe et al. | |
| 2006/0196128 | A1 | 9/2006 | Duke | |
| 2006/0266405 | A1 | 11/2006 | Lenox | |
| 2006/0266406 | A1 | 11/2006 | Faust et al. | |
| 2007/0044410 | A1 | 3/2007 | Kalkanoglu | |
| 2007/0054987 | A1 | 3/2007 | Zanchetta et al. | |
| 2007/0074754 | A1 | 4/2007 | Farquhar et al. | |
| 2007/0095388 | A1 | 5/2007 | Mergola et al. | |
| 2007/0157963 | A1 | 7/2007 | Metten et al. | |
| 2007/0181174 | A1 | 8/2007 | Ressler | |
| 2007/0193618 | A1 | 8/2007 | Bressler et al. | |
| 2007/0199590 | A1 | 8/2007 | Tanaka et al. | |
| 2007/0283996 | A1 | 12/2007 | Hachtmann et al. | |
| 2007/0294287 | A1 | 12/2007 | Baek | |
| 2008/0006323 | A1 | 1/2008 | Kalkanoglu et al. | |
| 2008/0053519 | A1 | 3/2008 | Pearce et al. | |
| 2008/0066323 | A1 | 3/2008 | Crain et al. | |
| 2008/0083176 | A1 | 4/2008 | Barsun et al. | |
| 2008/0121270 | A1 | 5/2008 | Mayer et al. | |
| 2008/0135088 | A1 | 6/2008 | Corrales | |
| 2008/0135090 | A1 | 6/2008 | Corrales | |
| 2008/0135092 | A1 | 6/2008 | Corrales | |
| 2008/0135094 | A1 | 6/2008 | Corrales | |
| 2008/0160804 | A1 | 7/2008 | Daily et al. | |
| 2008/0190047 | A1 | 8/2008 | Allen | |
| 2008/0245399 | A1 | 10/2008 | DeLiddo | |
| 2008/0245405 | A1 | 10/2008 | Garvison et al. | |
| 2008/0248242 | A1 | 10/2008 | Shiao et al. | |
| 2008/0271773 | A1 | 11/2008 | Jacobs et al. | |
| 2008/0271774 | A1 | 11/2008 | Kalkanoglu et al. | |
| 2008/0289272 | A1 | 11/2008 | Flaherty et al. | |
| 2008/0302030 | A1 | 12/2008 | Stancel et al. | |
| 2008/0302031 | A1 | 12/2008 | Bressler et al. | |
| 2008/0302408 | A1 | 12/2008 | Bressler et al. | |
| 2008/0302409 | A1 | 12/2008 | Bressler et al. | |
| 2008/0314434 | A1 | 12/2008 | Khouri et al. | |
| 2009/0000221 | A1 | 1/2009 | Jacobs et al. | |
| 2009/0000222 | A1 | 1/2009 | Kalkanoglu et al. | |
| 2009/0000657 | A1 | 1/2009 | Jacobs | |
| 2009/0014058 | A1 | 1/2009 | Croft et al. | |
| 2009/0044854 | A1 * | 2/2009 | Placer et al. | 136/251 |
| 2009/0095339 | A1 | 4/2009 | Nightingale | |
| 2009/0120484 | A1 | 5/2009 | Nightingale | |
| 2009/0126782 | A1 | 5/2009 | Krause et al. | |
| 2009/0133340 | A1 | 5/2009 | Shiao et al. | |
| 2009/0133739 | A1 | 5/2009 | Shiao et al. | |
| 2009/0133740 | A1 | 5/2009 | Shiao et al. | |
| 2009/0159118 | A1 | 6/2009 | Kalkanoglu et al. | |
| 2009/0178350 | A1 | 7/2009 | Kalkanoglu et al. | |
| 2009/0194143 | A1 | 8/2009 | Jacobs et al. | |
| 2009/0205270 | A1 | 8/2009 | Shaw et al. | |
| 2009/0205704 | A1 | 8/2009 | Flaherty et al. | |
| 2009/0223550 | A1 | 9/2009 | Curtin et al. | |
| 2009/0241450 | A1 | 10/2009 | Italiane et al. | |
| 2009/0242015 | A1 | 10/2009 | Wattman et al. | |
| 2009/0249723 | A1 * | 10/2009 | Clark et al. | 52/309.13 |
| 2009/0255573 | A1 | 10/2009 | Taylor | |
| 2009/0272436 | A1 | 11/2009 | Cheung | |
| 2009/0302500 | A1 | 12/2009 | Haynes et al. | |
| 2009/0317593 | A1 | 12/2009 | Smith et al. | |
| 2009/0320389 | A1 | 12/2009 | White | |
| 2009/0320405 | A1 | 12/2009 | McCaskill et al. | |
| 2009/0324960 | A1 | 12/2009 | Richir et al. | |
| 2010/0012167 | A1 | 1/2010 | Milshtein et al. | |
| 2010/0018569 | A1 | 1/2010 | Mitchell et al. | |
| 2010/0043319 | A1 * | 2/2010 | Bennett | 52/173.3 |
| 2010/0064605 | A1 | 3/2010 | Corvaglia et al. | |
| 2010/0065107 | A1 | 3/2010 | Nightingale et al. | |
| 2010/0101634 | A1 | 4/2010 | Frank et al. | |
| 2010/0126561 | A1 | 5/2010 | Reich | |
| 2010/0126564 | A1 | 5/2010 | Salomoni et al. | |
| 2010/0146878 | A1 | 6/2010 | Koch et al. | |
| 2010/0151198 | A1 | 6/2010 | Khan | |

| | | | | | | |
|---|---|---|---|---|---|---|
| 2010/0180523 A1 | 7/2010 | Lena et al. | DE | 10358851 | 1/2005 | |
| 2010/0199584 A1 | 8/2010 | Kalkanoglu et al. | DE | 102005061709 | 3/2007 | |
| 2010/0236165 A1 | 9/2010 | Smith et al. | DE | 102008026505 | 2/2010 | |
| 2010/0269888 A1 | 10/2010 | Johnston, Jr. | EP | 436572 | 11/1995 | |
| 2010/0281794 A1* | 11/2010 | Saillard ............ 52/173.3 | EP | 1035591 | 9/2000 | |
| 2010/0313499 A1* | 12/2010 | Gangemi ............ 52/173.3 | EP | 1378010 | 2/2002 | |
| 2010/0313501 A1* | 12/2010 | Gangemi ............ 52/173.3 | EP | 1198012 | 4/2002 | |
| 2010/0313928 A1 | 12/2010 | Rose et al. | EP | 1553639 | 7/2005 | |
| 2010/0313941 A1 | 12/2010 | Huang et al. | EP | 2072708 | 6/2009 | |
| 2010/0325976 A1 | 12/2010 | Degenfelder et al. | EP | 2086019 | 8/2009 | |
| 2011/0000153 A1 | 1/2011 | Albert | EP | 2105971 | 9/2009 | |
| 2011/0000535 A1 | 1/2011 | Davidson | EP | 2146160 | 1/2010 | |
| 2011/0017278 A1 | 1/2011 | Kalkanoglu et al. | EP | 2149646 | 2/2010 | |
| 2011/0030761 A1 | 2/2011 | Kalkanoglu et al. | EP | 2171769 | 4/2010 | |
| 2011/0041428 A1 | 2/2011 | Posnansky | EP | 2246902 | 11/2010 | |
| 2011/0041429 A1 | 2/2011 | Rummens et al. | EP | 2369266 | 9/2011 | |
| 2011/0047902 A1 | 3/2011 | Cryar | FR | 2833033 | 6/2003 | |
| 2011/0047929 A1 | 3/2011 | Cappelli | FR | 2933999 | 1/2010 | |
| 2011/0048507 A1 | 3/2011 | Livsey et al. | FR | 2948709 | 2/2010 | |
| 2011/0056148 A1 | 3/2011 | Jenkins et al. | FR | 2938567 | 5/2010 | |
| 2011/0067327 A1 | 3/2011 | Eiffert et al. | FR | 2943369 | 9/2010 | |
| 2011/0083381 A1* | 4/2011 | David et al. ............ 52/173.3 | FR | 2944304 | 10/2010 | |
| 2011/0094170 A1 | 4/2011 | Kalkanoglu et al. | FR | 2961539 | 12/2011 | |
| 2011/0094171 A1 | 4/2011 | Burkhardt et al. | GB | 2340993 | 3/2010 | |
| 2011/0094560 A1 | 4/2011 | Keenihan et al. | GB | 2471172 | 12/2010 | |
| 2011/0094568 A1 | 4/2011 | Keenihan et al. | JP | 2002-004485 | 1/2002 | |
| 2011/0094570 A1 | 4/2011 | Boven et al. | JP | 4776087 | 11/2002 | |
| 2011/0100436 A1 | 5/2011 | Cleereman et al. | JP | 2003-119962 | 4/2003 | |
| 2011/0100438 A1 | 5/2011 | Gaston et al. | JP | 2004-143910 | 5/2004 | |
| 2011/0108087 A1 | 5/2011 | Croft et al. | JP | 3609744 | 10/2004 | |
| 2011/0114158 A1 | 5/2011 | Lenox | JP | 2005-036604 | 2/2005 | |
| 2011/0132427 A1 | 6/2011 | Kalkanoglu et al. | JP | 3798578 | 7/2006 | |
| 2011/0138710 A1* | 6/2011 | Reisdorf et al. ............ 52/173.3 | JP | 3798579 | 7/2006 | |
| 2011/0138711 A1* | 6/2011 | Seng et al. ............ 52/173.3 | JP | 3980265 | 9/2007 | |
| 2011/0139250 A1 | 6/2011 | Du et al. | JP | 4138697 | 8/2008 | |
| 2011/0174365 A1 | 7/2011 | Drake et al. | JP | 4302826 | 7/2009 | |
| 2011/0183540 A1 | 7/2011 | Keenihan et al. | JP | 2010-030263 | 2/2010 | |
| 2011/0185650 A1 | 8/2011 | Kalkanoglu et al. | JP | 4776087 | 9/2011 | |
| 2011/0185651 A1 | 8/2011 | Taylor | KR | 2011-0034585 | 4/2011 | |
| 2011/0185652 A1 | 8/2011 | Lenox | WO | 00/30184 | 5/2000 | |
| 2011/0185668 A1 | 8/2011 | Kiik et al. | WO | 01/99201 | 12/2001 | |
| 2011/0189433 A1 | 8/2011 | Kiik et al. | WO | 2006/082399 | 8/2006 | |
| 2011/0197524 A1 | 8/2011 | Sahlin et al. | WO | 2007/138316 | 12/2007 | |
| 2011/0197954 A1 | 8/2011 | Young et al. | WO | 2008/052816 | 5/2008 | |
| 2011/0209420 A1 | 9/2011 | Roach et al. | WO | WO 2008/052816 | 5/2008 | |
| 2011/0209421 A1 | 9/2011 | Arguelles | WO | 2009/018016 | 2/2009 | |
| 2011/0209745 A1 | 9/2011 | Korman et al. | WO | 2009/043894 | 4/2009 | |
| 2011/0220183 A1 | 9/2011 | Mills et al. | WO | 2009/046531 | 4/2009 | |
| 2011/0225904 A1 | 9/2011 | Railkar et al. | WO | 2009/071956 | 6/2009 | |
| 2011/0226305 A1 | 9/2011 | Chen et al. | WO | 2009/074167 | 6/2009 | |
| 2011/0232737 A1 | 9/2011 | Ruletzki et al. | WO | 2009/108874 | 9/2009 | |
| 2011/0232749 A1 | 9/2011 | Lienhart et al. | WO | 2010/026455 | 3/2010 | |
| 2011/0239555 A1 | 10/2011 | Cook et al. | WO | 2010/049967 | 5/2010 | |
| 2011/0249324 A1 | 10/2011 | Greer et al. | WO | 2010/079131 | 7/2010 | |
| 2011/0277821 A1 | 11/2011 | Cheng | WO | 2010/111383 | 9/2010 | |
| 2011/0289867 A1 | 12/2011 | Balbo DiVinadio | WO | 2010/112049 | 10/2010 | |
| 2011/0290296 A1 | 12/2011 | Daniel et al. | WO | 2010/124078 | 10/2010 | |
| 2011/0290304 A1 | 12/2011 | Daniel | WO | 2010/125173 | 11/2010 | |
| 2011/0297205 A1 | 12/2011 | Stevenson et al. | WO | 2010/140878 | 12/2010 | |
| 2011/0308563 A1 | 12/2011 | Shufflebotham | WO | 2011/002433 | 1/2011 | |
| 2012/0006397 A1 | 1/2012 | Gou et al. | WO | 2011/004092 | 1/2011 | |
| 2012/0011783 A1 | 1/2012 | Jacobs et al. | WO | 2011/023741 | 3/2011 | |
| 2012/0011784 A1 | 1/2012 | Shiao et al. | WO | 2011/093712 | 8/2011 | |
| 2012/0017972 A1 | 1/2012 | Jenkins et al. | WO | 2011/116257 | 9/2011 | |
| 2012/0023841 A1 | 2/2012 | Renna | WO | 2011/153106 | 12/2011 | |
| 2012/0025618 A1 | 2/2012 | Erickson et al. | | | | |
| 2012/0110932 A1 | 5/2012 | Ehbing et al. | | | | |

FOREIGN PATENT DOCUMENTS

| | | |
|---|---|---|
| CN | 102168475 | 8/2011 |
| DE | 19938554 | 2/2001 |
| DE | 202004005432 | 10/2004 |

OTHER PUBLICATIONS

Jacobs et al., "Surface roughness effects on the solar reflectance of cool asphalt shingles", 2007, 16 page article.

* cited by examiner

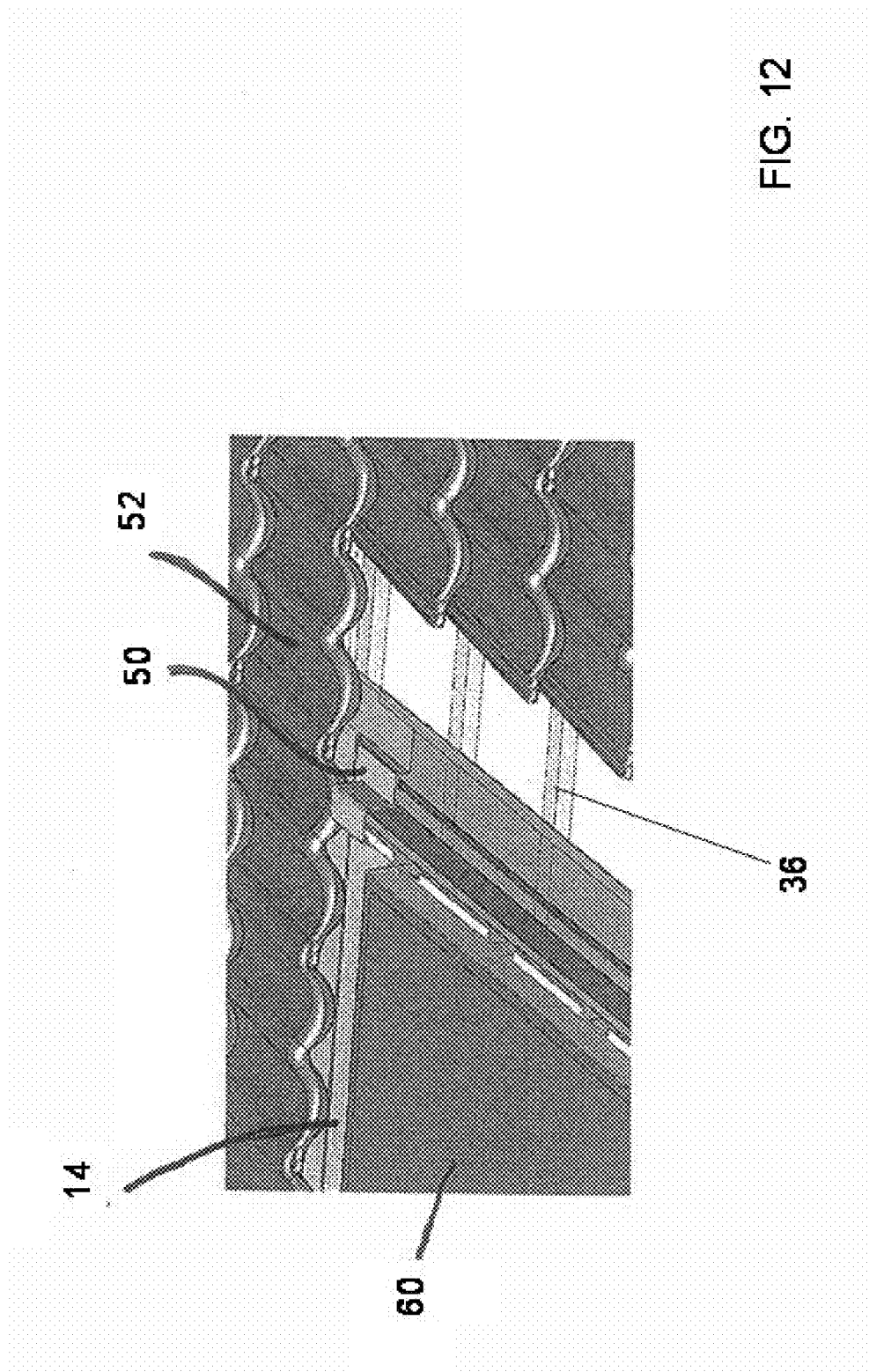

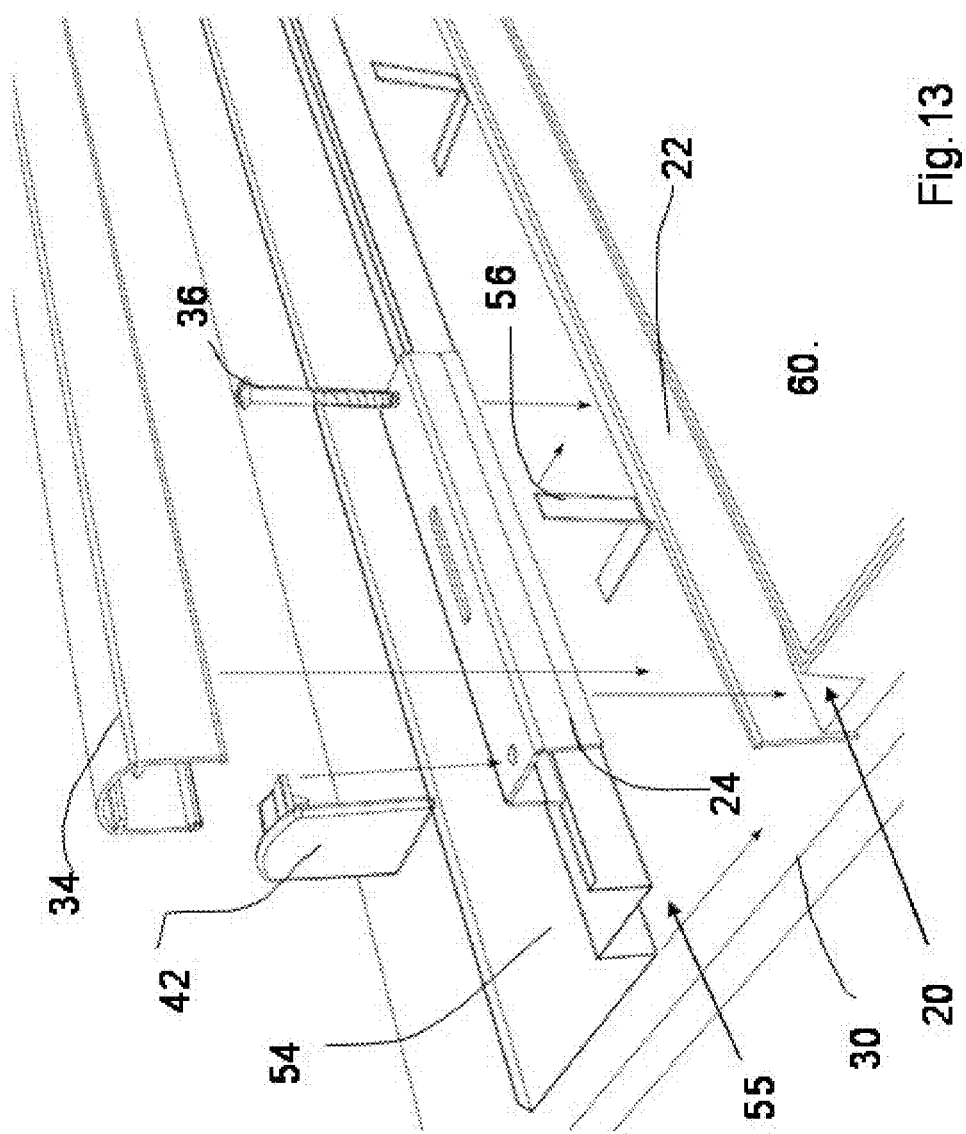

BUILDING-INTEGRATED SOLAR-PANEL ROOF ELEMENT SYSTEMS

FIELD OF THE INVENTION

The present invention relates to the field of integrated solar-panel roofing systems, in particular photovoltaic systems.

BACKGROUND OF THE INVENTION

Due to increasing environmental concerns, alternatives to non-renewable and polluting fossil fuels have been investigated. Solar energy has received increasing attention as an alternative renewable, non-polluting energy source, and photovoltaic installations on commercial and residential roofs are becoming increasingly popular. The majority of existing installations to date consist of non-integrated systems. These systems generally consist of an array of photovoltaic or solar thermal modules attached on top of an existing roof covering.

"Add-on" structures can be installed on any type of roofing as "stand alone" solar systems. However, such systems typically require separate support structures that are bolted together to form an array of larger solar panels. Further, "add-on" solar panels are heavy and are more costly to manufacture, install and maintain. For example, the assembly of the arrays is typically done on-site or in the field rather than in a factory. Mounting arrays onto the roof may also require structural upgrades to the building.

Building Integrated Photovoltaics "BIPV" differ in that they act as roof covering and photovoltaic solution in one. BIPV solutions are required to interface with current roof coverings such as tiles, slates and metal roofing. This is because the whole surface of a roof is rarely used for power generation. The term "building-Integrated" is commonly used in the solar panel industry to differentiate this type of installation from that of a non-integrated system. This term implies that the photovoltaic or thermal solar panels constitute structural elements of a roof.

This invention is concerned particularly with integrated systems of the BIPV or solar thermal type, that are applicable to new roofs and can also be adapted to existing roofs.

Commonly used materials for photovoltaic panels include glass (as a support and protection for potentially delicate wafers) and extruded aluminum frames which are cut and assembled around the glass in much the same way as a picture frame. These assemblies are then attached to the roof by means of brackets. Some BIPV solutions on the market require a specific roof covering to be used, which diminishes the choice for a customer. Some other products on the market try to address this gap, however the choice of roof covering is often limited, and the installation can often be very time consuming in order to guarantee water-tightness of the installation. Other problems are that it is complicated to integrate some systems in standard sloped roofs; there are complications for installation and de-installation; and size limitations may lead to increased installation costs because installing many small panels is more labor intensive. Similar considerations apply to the installation of thermal solar panels.

US patent publication 2006/0196128 describes a mounting for solar panels that are inclined in asymmetric frames where a wedge-like bottom of one frame fits under a thick end of another frame, the frames being connected side-by-side by protruding interlocking fixings. The frame is a small unit designed to be moulded from recycled plastic.

US patent publication 2006/0042680 describes a BIPV structure with a plastic frame around a PV laminate, mounted on a polymer substrate for fitting on a rafter. This requires a complicated sealing arrangement.

WO 2008/052816 describes an integrated modular photovoltaic element designed to match with classic tiles, the element comprising a lower hollow structural part of plastic material and an upper convex element of light-transparent material. This structure is relatively complex.

U.S. Pat. No. 7,012,188 describes a BIPV framing system for solar panels made up of interconnected frame elements joined with a capping element over facing edges. This design requires a supplementary polymeric sealing strip.

SUMMARY OF THE INVENTION

The invention provides a building-integrated solar-panel roof element, such as a photovoltaic (BIPV) roof element, adapted to be fitted with a solar panel and integrated in a pitched roof, as well as such a building-integrated roof element fitted with a photovoltaic or solar thermal panel, and an array of these solar energy roof elements mounted on a pitched roof.

The invention aims to provide a building integrated system roof element which:
- is universal and compatible to any kind of tiles or slates;
- can be easily dismounted but also mounted back, without disrupting the other elements making up the complete covering of the roof;
- is adapted to be surrounded by a flashing system that allows for waterproofing of the system;
- does not need an undertile system which often leads to waterproof problems;
- can be made to any convenient size which combines ease of handling with reduced installation costs.

According to a main aspect, the invention provides a building-integrated solar-panel roof element, in particular a photovoltaic (BIPV) roof element, adapted to be fitted with a photovoltaic or other solar panel and integrated in a pitched roof, the roof element comprising an open generally-rectangular moulded polymer frame having a top edge, a bottom edge and two side edges defining therebetween a central rectangular opening, the frame further having an outer face and an inner face. The invention provides one or more of the following features.

The side edges of the frame each have an integrally-moulded outside part in the form of a generally U-shaped profile that is open in the direction of the frame's outer face. This outside part of the frame has at or towards its outside an upstanding longitudinal side wall, such that the side walls extend along the respective side edge whereby adjacent side-by-side elements can be placed with their adjacent side walls in facing relationship.

The top edge and the bottom edge of the frame are so configured that the elements can be placed on a pitched roof with the top edge of one element against the bottom edge of an adjacent element that is placed above and in extension of said one element, with these top and bottom edges overlapping or interengaging with one another.

Each roof element is arranged so that when a plurality of the elements each fitted with a photovoltaic or other solar panel are integrated in a pitched roof with the side walls of adjacent side-by-side elements in facing relationship and with the top and bottom edges respectively of adjacent lower and upper elements overlapping or interengaging with one another, the elements can be mounted on the roof by means of fitting brackets engaging with the side walls of the elements, to form a generally planar solar panel array from which any one of the elements can be dismounted and re-installed without interfering with the in-place mounting of the other elements of the array.

Another aspect of the invention is an array of building-integrated roof elements as set out above, with photovoltaic or solar thermal panels fitted in the elements and mounted on a pitched roof with the side walls of adjacent side-by-side elements in facing relationship, and secured to the roof by brackets engaging the adjacent side walls of the adjacent side-by-side roof elements.

Further aspects of the invention are set out in the following description and in the claims.

BRIEF DESCRIPTION OF THE DRAWINGS

The invention will be further described by way of example with reference to the accompanying schematic drawings, in which:

FIG. 12 is a perspective view showing a roof element installed on a roof with a flashing system; and FIG. 13 is an exploded perspective view showing a lateral flashing element for a full boarded roof.

DETAILED DESCRIPTION

The drawings show by way of example a photovoltaic system according to the present invention that comprises a polymeric frame 10 for supporting in particular a photovoltaic module. For installation on a roof, the polymeric frame supports and is attached to a photovoltaic or solar thermal module by an adhesive interface.

Figure 1:
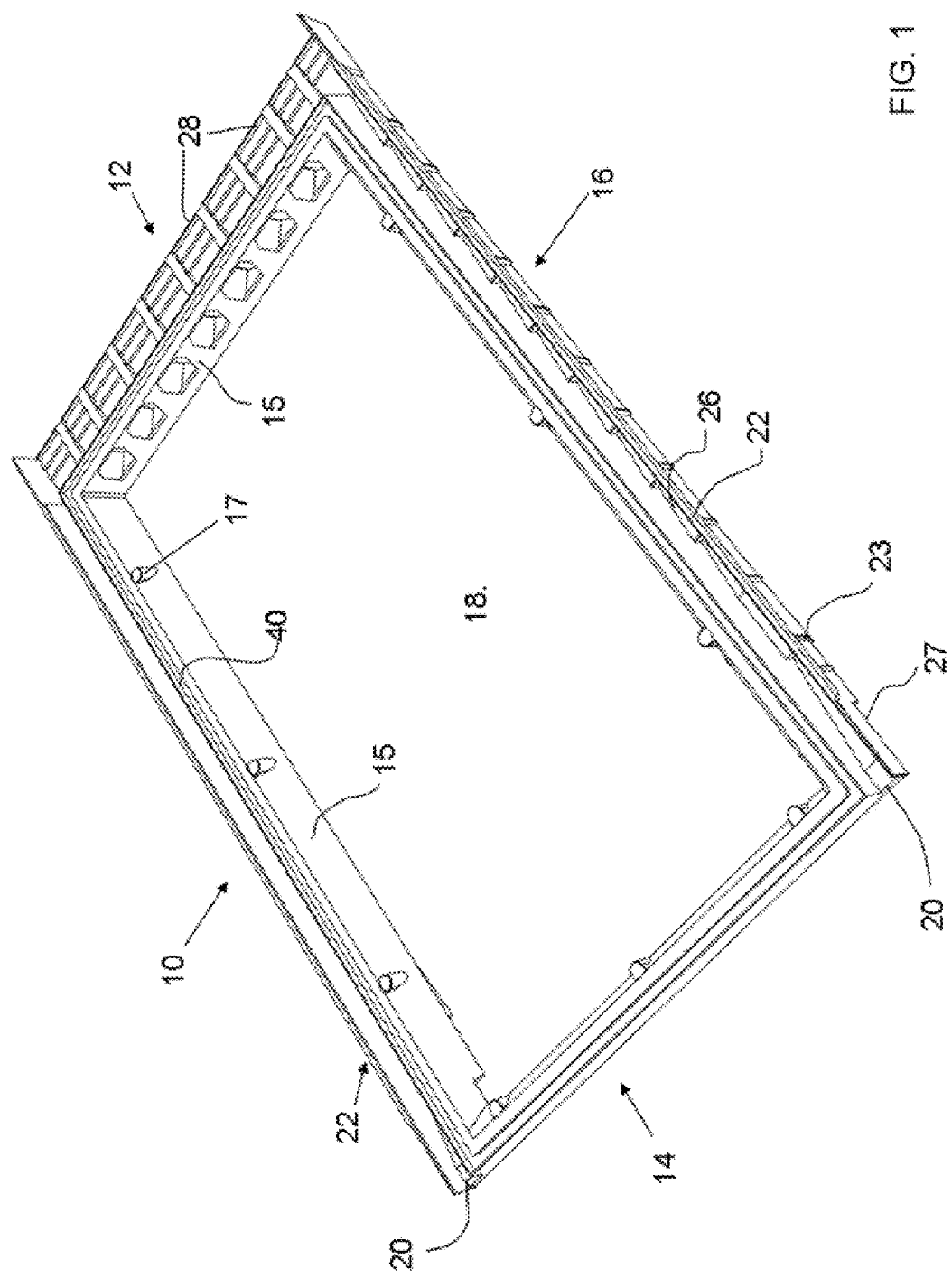
FIG. 1 is a perspective view from above the polymeric frame.
Figure 2:
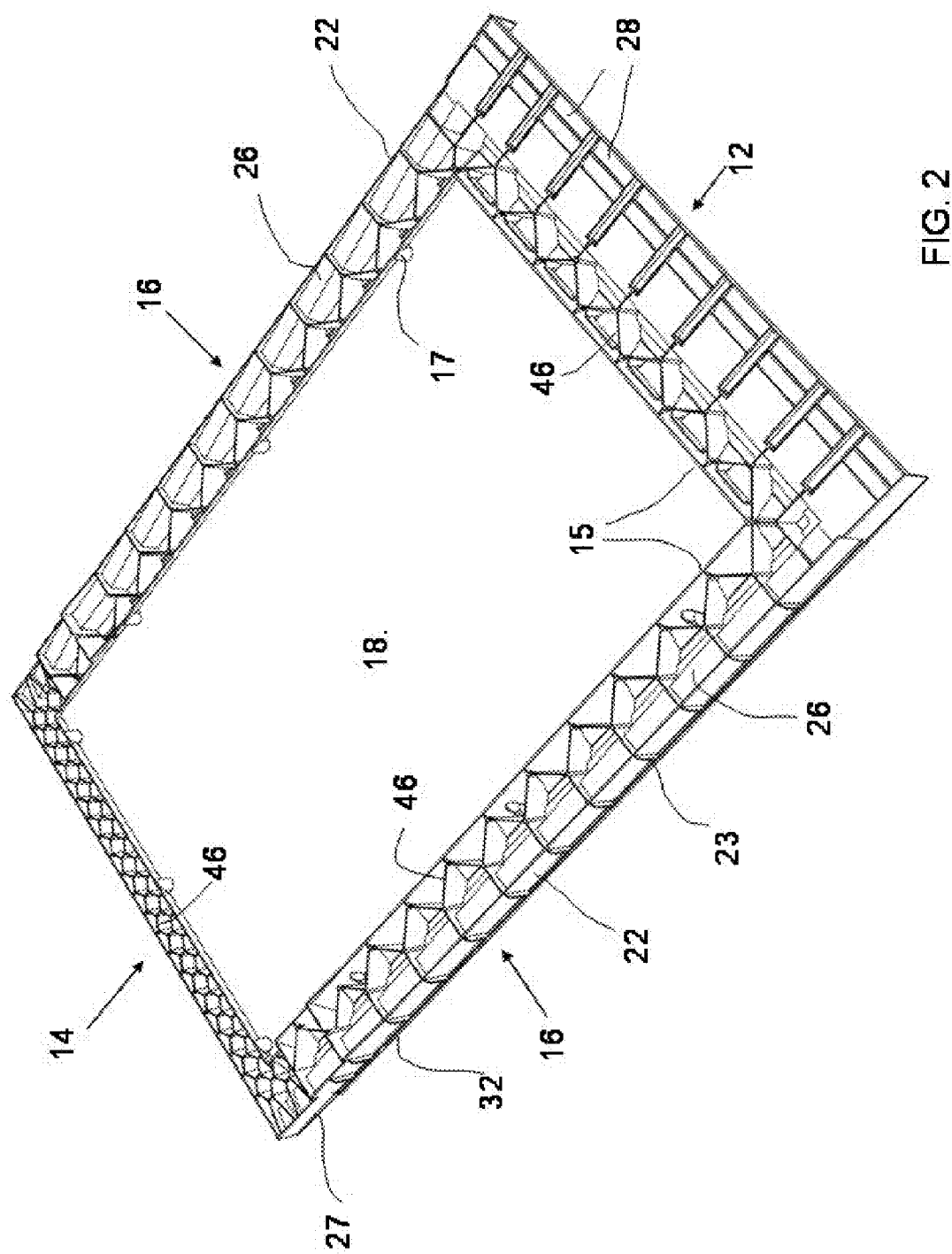
FIG. 2 is a perspective view showing the underside of the polymeric frame.

The drawings show a building-integrated photovoltaic (BIPV) roof element that is adapted to be fitted for example with a photovoltaic panel and integrated in a pitched roof, the roof element comprising an open generally-rectangular moulded polymer frame 10 having a top edge 12, a bottom edge 14 and two side edges 16 defining therebetween a central rectangular opening 18, the frame 10 further having an outer face (shown in FIG. 1) and an inner face (shown in FIG. 2).

The side edges 16 of frame 10 each have an integrally-moulded outside part in the form of a generally U-shaped profile 20 that is open in the direction of the frame's outer face and has at or towards its outside an upstanding longitudinal side wall 22. The side walls 22 extend along the respective side edge 16 whereby adjacent side-by-side elements can be placed with their adjacent side walls 22 in facing relationship, as shown in FIG. 4.

Figure 9:
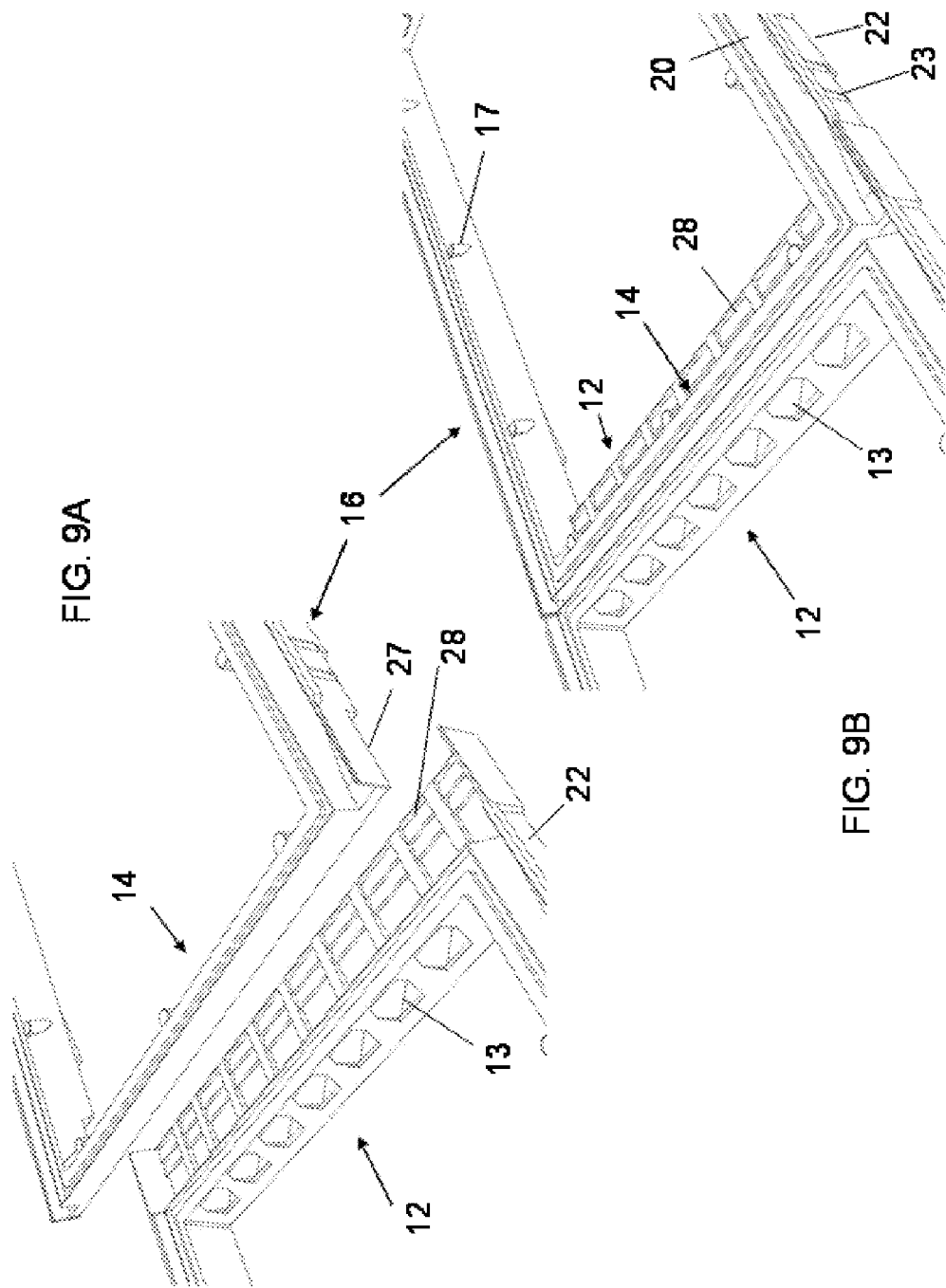
FIG. 9A and FIG. 9B are cut-away perspective views illustrating the assembly of the top of one frame with the bottom of another.

The top edge 12 and the bottom edge 14 of frame 10 are so configured that the elements can be placed on a pitched roof with the top edge 12 of one element against the bottom edge 14 of an adjacent element that is placed above and in extension of said one element, with these top and bottom edges 12, 14 overlapping or interengaging with one another. For this, the bottom ends of the side walls 22 have recessed parts 27 defining spaces for receiving the top end of the side walls 22 of adjacent elements, as illustrated in FIGS. 9A and 9B.

Figure 4:
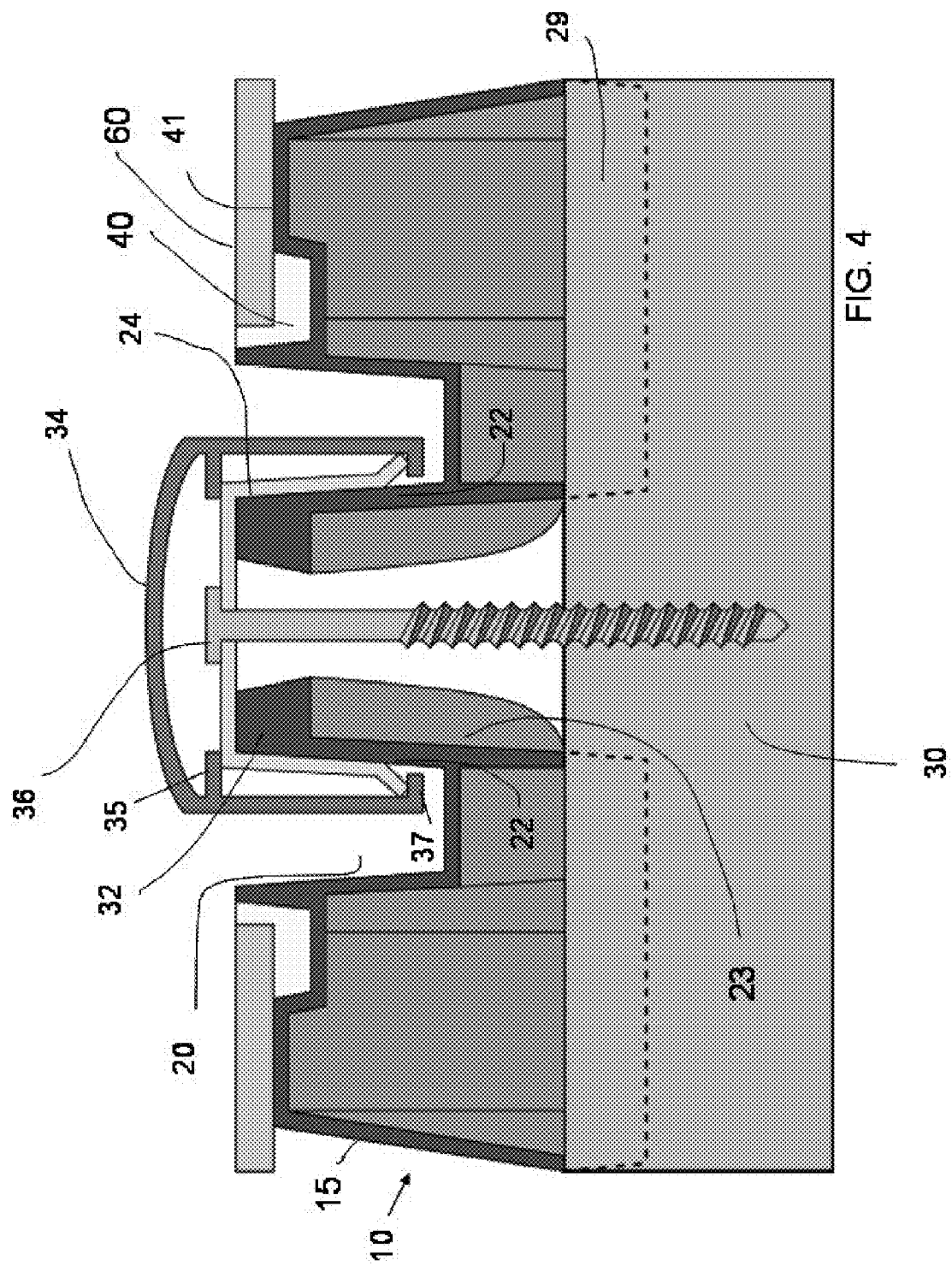
FIG. 4 is a cross-sectional view showing a fixing bracket on the facing sidewalls of two side-by-side adjacent roof elements, and the securing to a roof batten.

Each roof element is arranged so that when a plurality of the elements whose frames 10 are each fitted with a photovoltaic panel are integrated in a pitched roof with the side walls 22 of adjacent side-by-side elements in facing relationship and with the top and bottom edges 12, 14 respectively of adjacent lower and upper elements overlapping or interengaging with one another, the elements can be mounted on the roof by means of metal fitting brackets 24 engaging with the side walls 22 (see FIG. 4). As a result of this configuration, the elements can form a generally planar photovoltaic array from which any one of the elements can be dismounted and re-installed without interfering with the in-place mounting of the other elements of the array.

Figure 8:
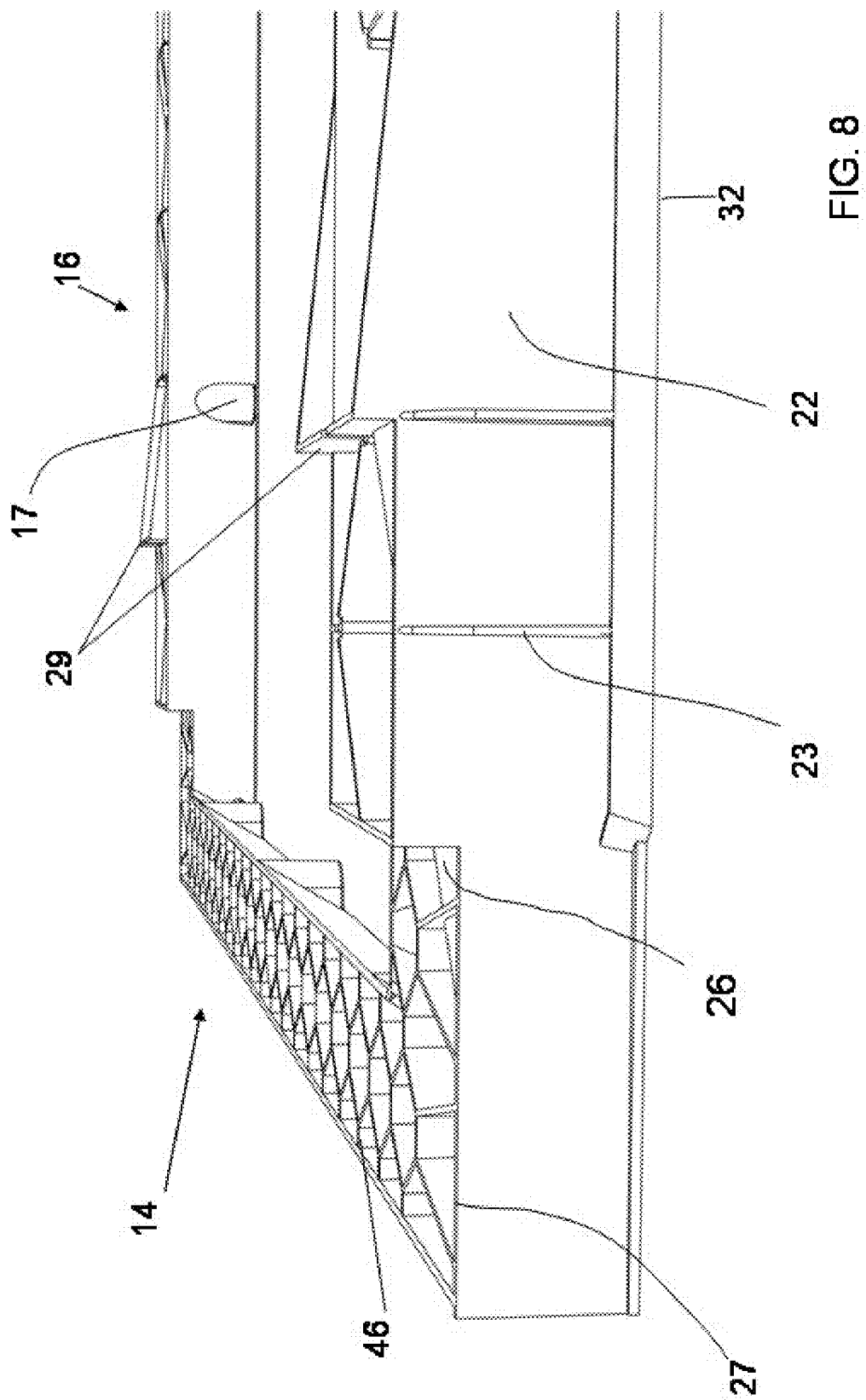
FIG. 8 is a side view showing the bottom part of the polymeric frame with integral projections for positioning the frame relative to roof battens.

Each side edge 22 of frame 10 has, on its inner face adjacent to the bottom edge, an integrally-moulded projection 29 (FIG. 8) for engaging against a roof batten to position the roof element relative to the roof batten. Should the roof be a full boarded roof, i.e. a roof that does not comprise roof battens and counter battens, the side edge 22 of frame 10 does not need to comprise the integrally-moulded projections 29.

The inner periphery of the edges 12, 14, 16 of the frame 10 has an integrally-moulded flared skirt 15 (FIG. 1) that widens towards the inner face of frame 10. On this skirt 15 can be seen a plurality of injection points 17 that result from the injection moulding process. These injection points 17 do not constitute functional elements of the frame 10.

Material Used to Manufacture the Frame

The thermoplastic composition used to manufacture the polymeric frame 10 comprise a thermoplastic resin such as for example polypropylenes; polyamides and semi-aromatic polyamides; polyesters such as for example poly(ethylene terephthalate) (PET), poly(1,4-butylene terephthalate) (PBT) and poly(1,4-cyclohexyldimethylene terephthalate) (PCT); liquid crystalline polymer (LCP) such as for example polyesters, poly(ester-amides) and poly(ester-imides); polyphenylene sulfides (PPS); polycarbonates (PC); and polyvinyl chlorides (PVC). Other materials like polyurethane (PU) in homogeneous or foamed form are also possible.

The thermoplastic composition used to manufacture the polymeric frame 10 may further comprise modifiers and other ingredients, including, without limitation, ultraviolet light stabilizers, flame retardants, impact modifiers, flow enhancing additives, lubricants, antistatic agents, coloring agents, nucleating agents, crystallization promoting agents and other processing aids known in the polymer compounding art.

The polymeric frame 10 may be manufactured by shaping the thermoplastic composition described above. By "shaping", is meant any shaping technique, such as for example extrusion, injection moulding, thermoform moulding or compression moulding and/or any kind of flexible moulding like silicon moulding obtained by stereo litho or other technique, or by casting a polymer resin into a mould. Preferably, however, the polymeric frame is shaped by injection moulding.

Design of the Frame

Figure 3:
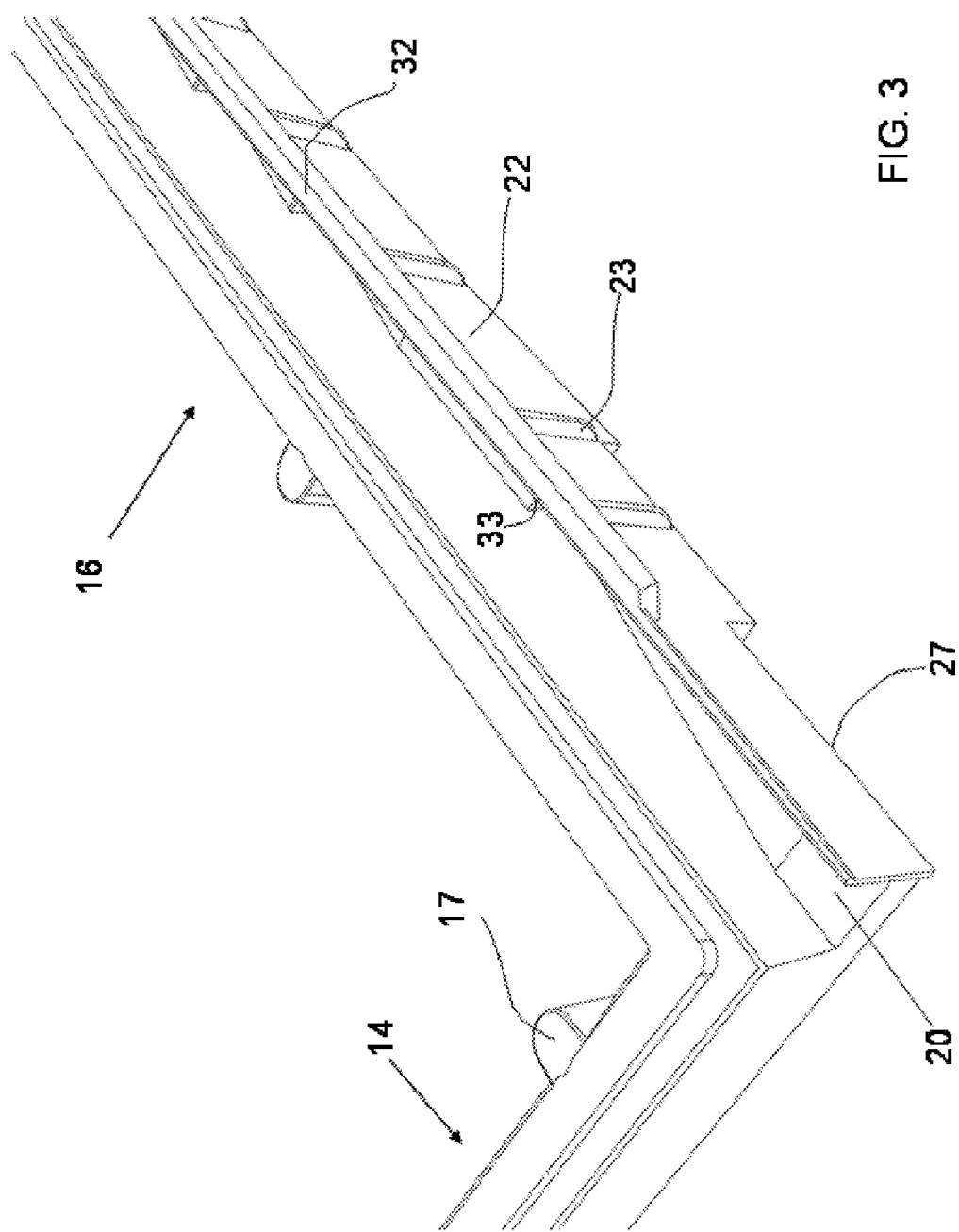
FIG. 3 is a cut-away perspective view from above one corner of the lower part of the polymeric frame.
Figure 7:
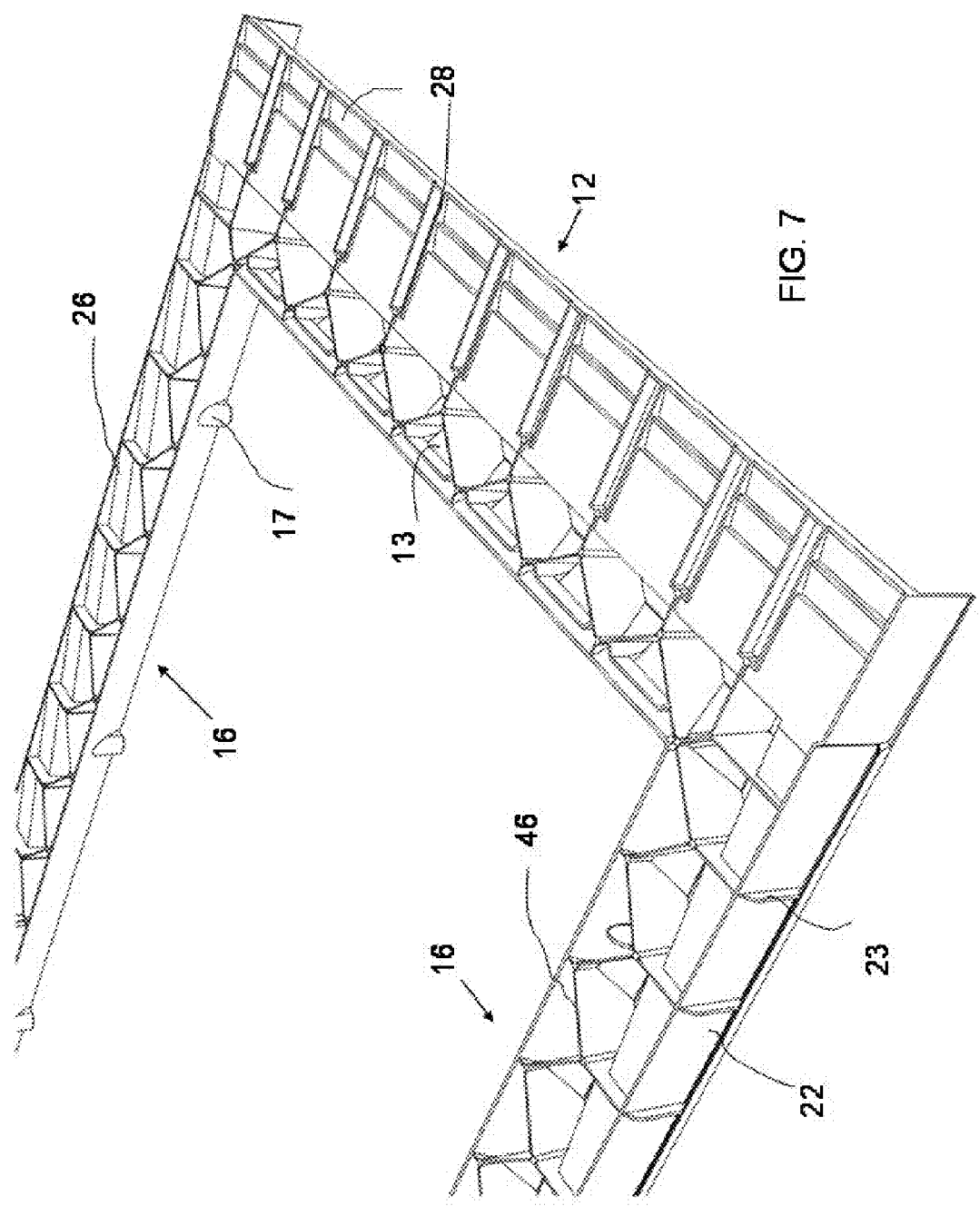
FIG. 7 is a perspective view of the underside of the polymeric frame showing the top edge and part of the two side edges.

The edges 12,14,16 of frame 10 have an open honeycomb-like structure that opens into the inner face of the frame, as shown in FIGS. 2 and 7. This honeycomb-like structure is defined by a plurality of integrally-moulded triangulated ribs 46 along the sides 16 and the inside of top edge 12 and the bottom edge 14, that extend towards the open inner face of the frame's edges. Further step-like ribs 26 are provided along the bottoms of the channels 20 (except that these ribs 26 are absent or less pronounced along the bottom ends of the channel 20, as shown in FIGS. 1 and 3), and yet further shallow step-like ribs 28 are provided in the top ends 12. The thus-designed polymeric frame 10 provides sufficient torsional rigidity so as to prevent damage to the potentially delicate photovoltaic module. It is also designed so as to provide resistance to physical loading of the frame under such conditions as snow coverage or lift from high winds when the elements are installed on a roof.

The polymeric frame 10 further has moulded in features (namely the side walls 22) that act as an interface between adjacent panels. The frame 10 also has moulded in features that are used in conjunction with brackets 24 to anchor the panel, and adjacent panels to the underlying roof structure 30, as shown in FIG. 4.

The top and bottom edges 12, 14 are arranged such that the bottom edge 14 of an upper element fits in overlapping relationship over the top edge 12 of an adjacent lower element, with the recessed part 27 of the bottom edge 14 fitting inside the end parts of walls 22 on the upper edge 12, as shown in FIGS. 9A and 9B. The top edges 12 have apertures 13 that form air passages allowing the upflow of air from under the lower element to under the upper element. These apertures 13 are further arranged to prevent the ingress of water. Air flow is possible both for air entering through the adjacent panels, and for air passing under the panels. This feature of the invention consists of allowing enough ventilation under the back of the glass module to limit the increase of the temperature in between acceptable limits. The air venting apertures 13 are located right at the overlap of each panel to the next in the vertical direction.

Figure 5:
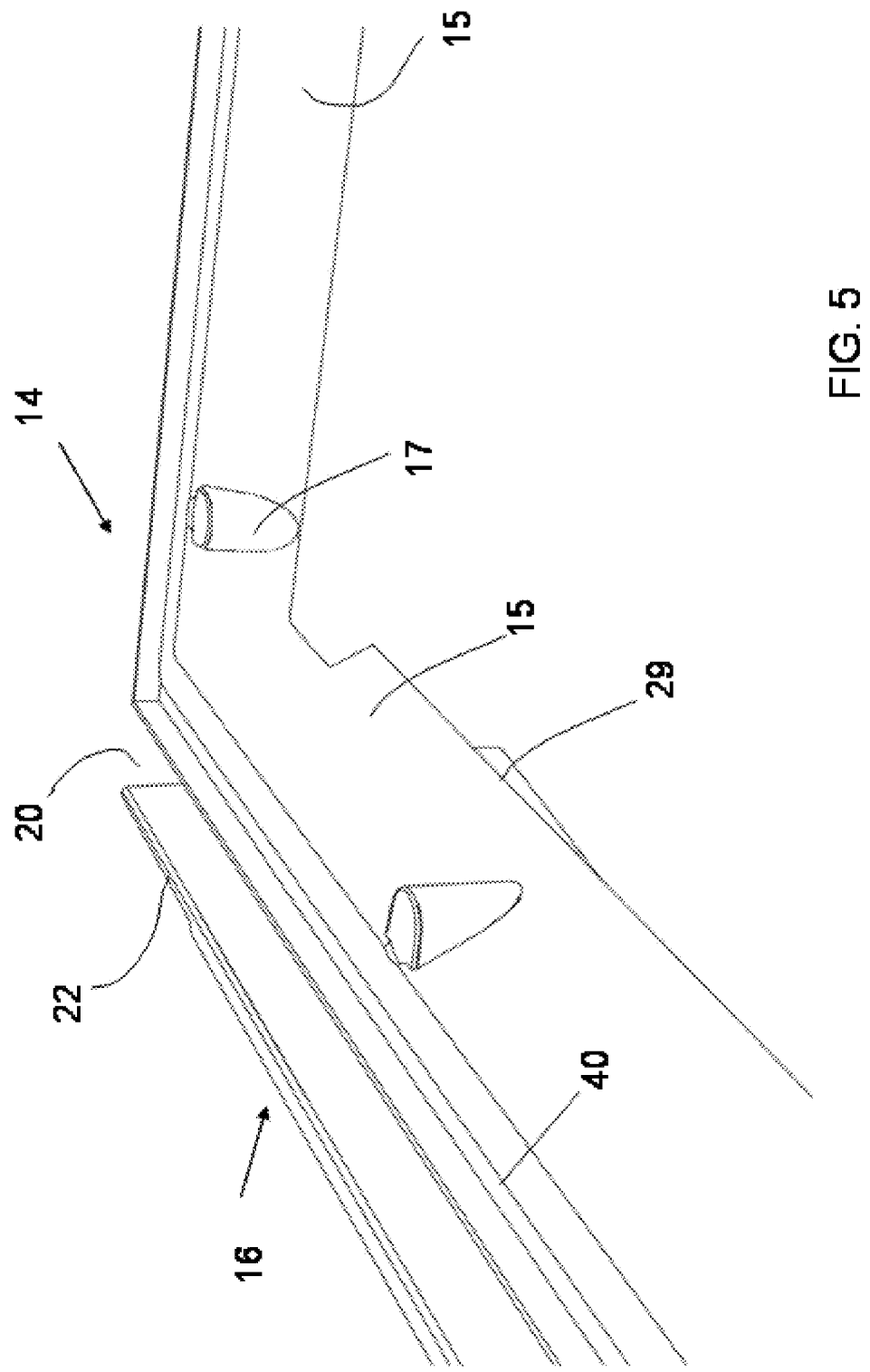
FIG. 5 is a perspective view from above one inner corner of the bottom of a polymeric frame.
Figure 6:
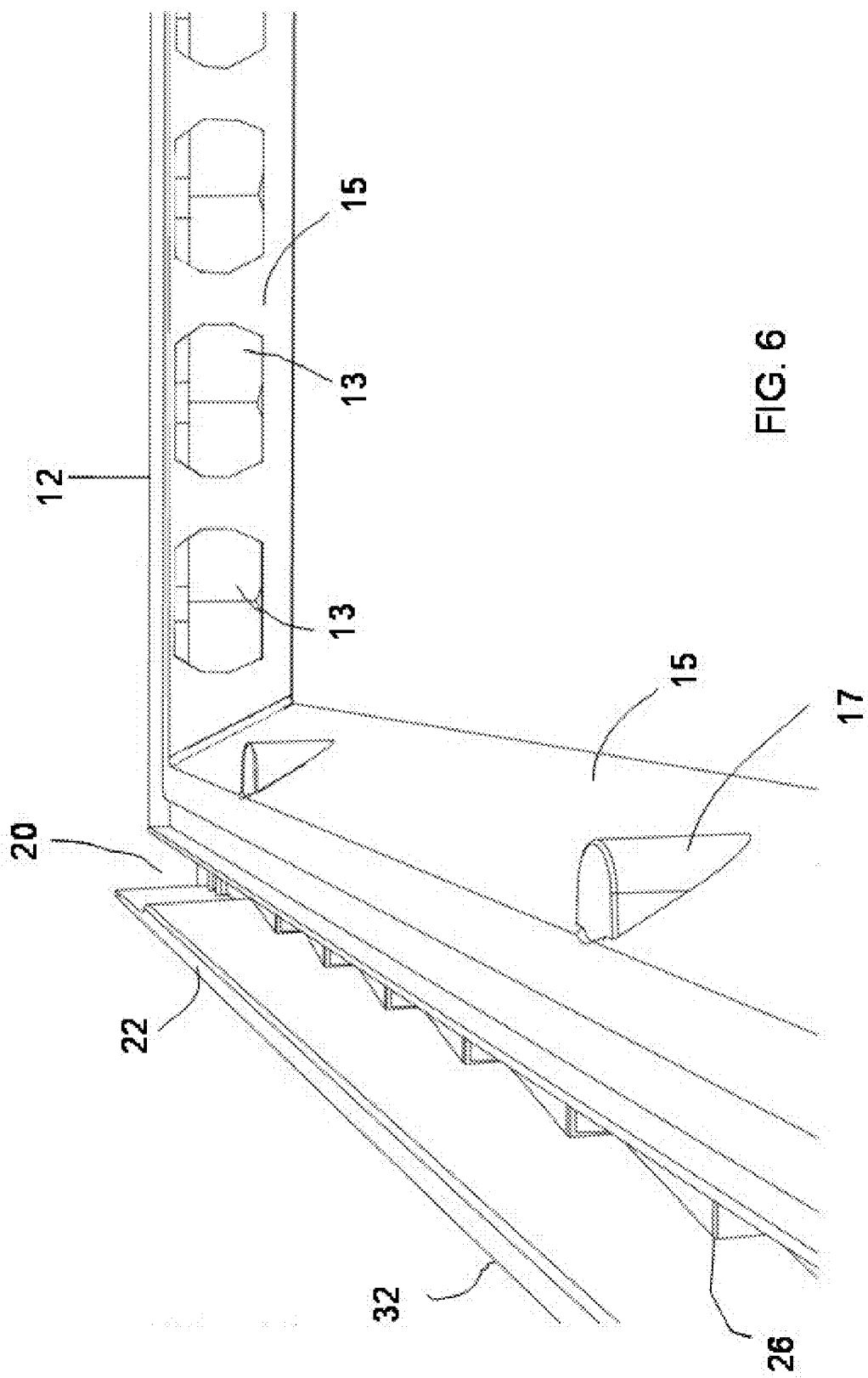
FIG. 6 is a perspective view from above one inner corner of the top of a polymeric frame, illustrating air vents.

As can be seen on FIG. 5, in the region of the bottom edge 14 of the frame, the bottom edge of the skirt 15 is raised relative to the bottom edge of the skirt 15 along the side edges. This raised part of the skirt edge in the bottom edge 14 allows passage of the protruding part of the top end 12 of an adjacent element, as shown in FIG. 9B.

The polymeric frame 10 supports and secures the glass photovoltaic module 60 (FIGS. 4 and 9) and seals the roof by a fitment and embedding system between each panel in the top-bottom direction of the roof and with a specially designed sealing retaining profile 40/41 between each panel in the left to right direction.

The frames 10 of two side-by-side elements interface by means of a joint that ensures a waterproof seal between the two parts, as shown in FIG. 4. A plurality of U-shaped metal brackets 24 is used to attach the assembly to the roof structure 30 either on battens and/or counter battens or on the roof board when the roof element is fitted on a full boarded roof. The brackets 24 are adapted to fit between and grip the facing side walls 22 of adjacent side-by-side elements, the central connecting wall of each bracket 24 having an aperture for receiving an attachment member, namely a screw 36 to attach the element to a roof 30. The brackets 24 can be compact U pieces or long U-section profiles as illustrated in FIG. 13 and preferably have out-turned edges. For sealing purposes, an elongated strip-like profile 34 is adapted to engage over top parts 32 of adjacent side walls 22 of adjacent side-by-side elements, when the side walls are in facing relationship, as shown in FIG. 4, to form a substantially water-tight closure between the adjacent side-by-side elements. As shown, the top part of profile 34 can have inwardly-directed flanges 35 that engage on the top of the brackets 24, and inwardly-directed flanges at its open ends, that engage with the out-turned edges of the brackets 24. The strip-like profile 34 is preferably made of the same thermoplastic composition that is used to manufacture the polymeric frame.

Figure 10:
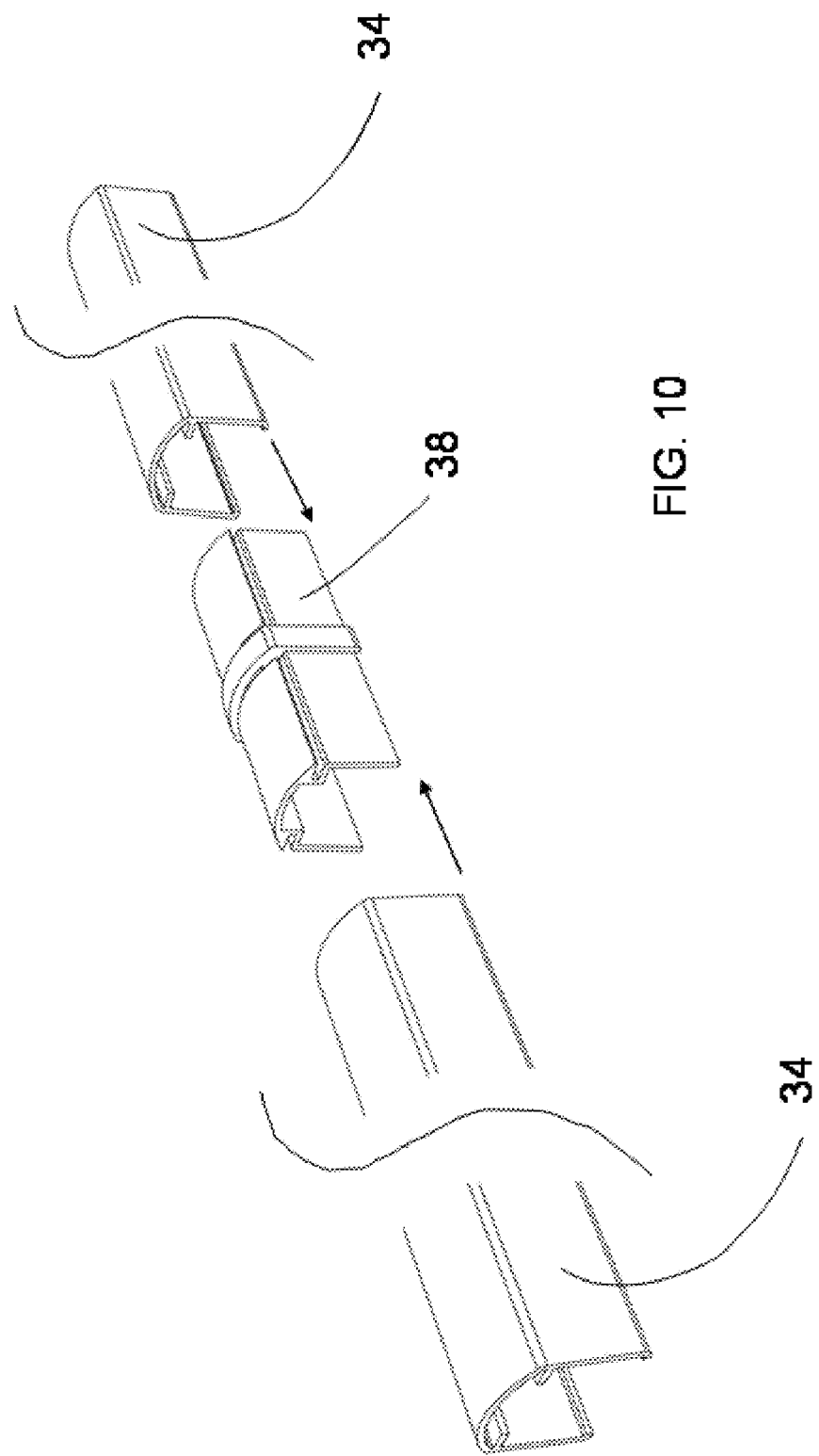
FIG. 10 is a broken-away perspective view of a connecting piece.

The length of the strip-like profile 34 can be adapted to the length of the polymeric frame and an intermediate connecting piece 38 (FIG. 10) may be further used to connect the strip-like profiles 34 of an assembly of adjacent top-bottom elements. The connecting piece 38 is preferably made by injection moulding a thermoplastic composition. The bottom of the strip-like profile 34 at the bottom of the installation may be closed by an adapted end cap 42 (FIGS. 10 and 13). The adapted end cap 42 is preferably also made by injection moulding a thermoplastic composition. The top end of the connecting piece 38 is closed by a flashing, as described below.

When an array of the elements is fitted on a roof, the elongated strip-like profile(s) 34 fit over top parts of the adjacent side walls 22 of facing adjacent side-by-side elements, the profile(s) 34 extending along all elements from top to bottom of the array, to form a substantially water-tight closure between the adjacent side-by-side elements. The said strip-like profiles 34 leave open the U-shaped profiles 20 that form rain drainage channels extending from top to bottom of the array. For this purpose, the step-like ribs 26 on the bottom of the channels are asymmetrically inclined with their top faces inclining downwards at a slope less than that of the pitched roof, so rain will drain down these channels 20 unobstructed.

There is also an integrally-moulded recessed channel 40 and ledge 41 (see FIGS. 1 and 4) located around the inner periphery of the outer face of the frame 10, for receiving an edge of a photovoltaic panel 60 of corresponding dimensions to fit panel 60 in the frame 10, leaving a space around the edge to accommodate for manufacturing tolerances and thermal expansion.

Figure 11:
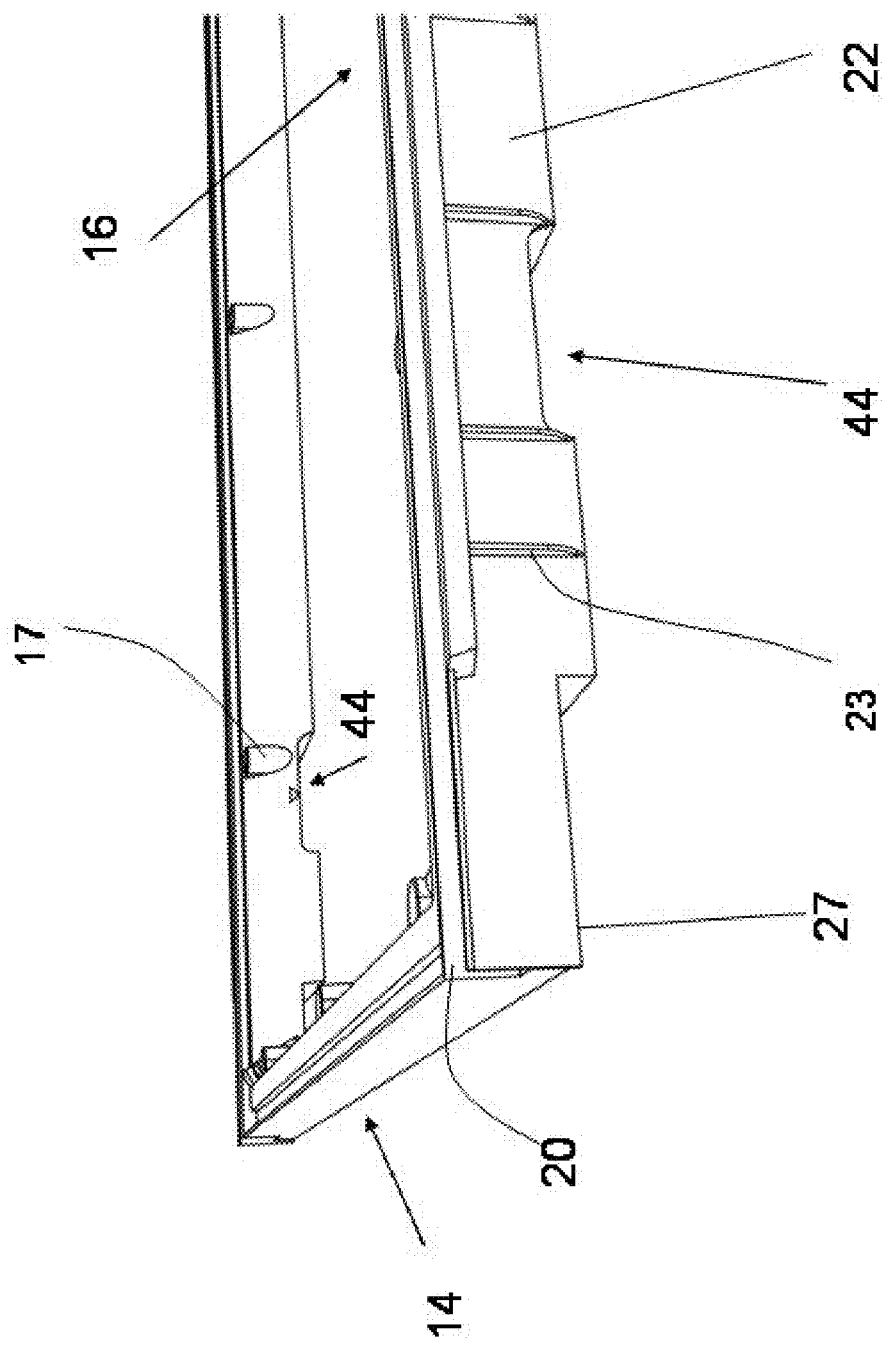
FIG. 11 a cut-away perspective view from above one corner of the lower part of another embodiment of polymeric frame showing an aperture in the frame adapted for when the frame is fitted on a full boarded roof.

As mentioned above, when the roof structure 30 comprises battens and counter battens, each side edge 22 of the frame 10 preferably has, on its inner face adjacent to the bottom edge, an integrally-moulded projection 29 for engaging against a roof batten and/or counter batten to position the roof element relative to the roof batten so that the frame 10 is blocked and secured in place against the batten. When the roof structure 30 does not comprise battens, i.e. when the roof structure is a full boarded roof, the integrally-moulded projection 29 can be dispensed with and can be replaced by an aperture 44 (FIG. 11). This aperture 44 in the frame 10 allows a passage for wires, cables and/or tubing and acts as a cable tray channel but also may be used to render the horizontal installation of the BIPV roof element easier.

The design of the frame 10 may be easily adapted so as to allow a landscape positioning of rectangular BIPV roof elements, by moulding the U-shaped profiles of the side edges along the shorter sides of the rectangular frame. Square frames are also possible.

The invention also covers the described BIPV roof element with a rectangular photovoltaic panel 60 (see FIG. 12) fitted in the frame 10 by adhesive bonding of the edges of the panel to the inner periphery of the outside of the frame 10. Thermal solar panels can be fitted in the same way.

The Solar Panels

The roof element according to the invention can incorporate photovoltaic panels or thermal solar panels, according to the requirements.

Any suitable type of photovoltaic panel can be fitted in the roof element according to the invention. This includes see-through types as well as types with an opaque backing. The panel can be substantially non-flexible or partly flexible. Usually the photovoltaic panel comprises a glass or transparent or translucent outside panel supporting on its rear face a photovoltaic material or cells. Many photovoltaic panels use wafer thin crystalline silicon cells, or thin films based on cadmium telluride or silicon, for example. Generally, any of the commercially available photovoltaic panels can be used. Electrical connections to the photovoltaic elements can be made by a group of conductors extending for example from one corner of the underside of the panel.

When thermal solar panels are fitted, provision will be made for the passage of tubing to inlet/outlet circulating liquid driven thermodynamically or by a pump.

When glass-supported solar panels are used, this adds considerably to the weight of the roof element/photovoltaic panel assembly. Here the design of the frame 10 with its reinforcing honeycomb-like structure plays an important role in maintaining the integrity of the assembly during handling, so that a single large panel can be handled by one or two persons, simplifying and reducing installation costs because of the relatively large surface area of the panels.

Other Elements

Additional elements of the panel include a junction box and connecting cables for the connection of the photovoltaic panels of adjacent elements or to an inverter. For thermal solar panels, the frame will include suitable passages for tubing to inlet/outlet circulating liquid.

Attachment to the Tiles and to the Roof.

For most installations, the building integrated system according to the invention comprises a plurality of photovoltaic panels assembled together and attached to the roof using a plurality of brackets 24 for this purpose. The plurality of photovoltaic panels may be assembled together in such a way to form a rectangular shape assembly, a U-shape or inverted U assembly, an L-shape assembly or other shapes adapted to accommodate for the particular roof configuration, for instance to pass around obstacles like chimneys. The integration of the top part of one element on a roof is shown in FIG. 12.

It is also possible to install an isolated single element on an area of a roof, though this is more unusual.

A plurality of brackets 24 is used to attach the assembly to the roof structure 30 (see FIGS. 4 and 12). The panel is intended to be used in conjunction with other identical panels in configurations that can be adapted to use some or all of the available space on a roof. The external border of these configurations is surrounded on all of its external sides by a flashing system 50 that allows for waterproofing of the system as a whole and integration with whichever roof covering is specified, such as tiles 52 as shown in FIG. 12, or slates.

The outermost side walls 22 of elements located at the outside of the array are held on the roof by brackets 56 that engage with the outermost side walls 22 and extend under an adjacent roof covering.

One or more flashing elements 50 extend from under the roof covering to engage with the outermost side walls, the uppermost top edge(s) and the lowermost bottom edge(s) of the elements. As shown in FIG. 12, a flashing element 50 extends along the top edge 14 of the element and over the U-shaped profiles 20 and outer wall 22 to a location where it will be covered by an adjacent tile (not shown). The external border of these configurations is thus surrounded by a flashing system 50 that allows for waterproofing of the system as a whole and integration with whichever roof covering is specified (tiles, slates).

When the panels are fitted to a roof 30 that is fully boarded, it is required to have a specific lateral flashing element 54 of stepped shape which leaves a passage 55 for wires and cables (FIG. 13). In addition to the specific lateral flashing element 54, and for mechanical reasons, L-shaped supports 56 can be further mounted against the outer faces of the side walls 22. FIG. 13 also shows a special metal bracket 24 of elongated U shape having several apertures for screws 36 in its central connecting part.

What is claimed is:

1. A roofing arrangement including a building-integrated solar-panel roof element adapted to be fitted with a solar panel and integrated in a pitched roof, the roof element comprising:
   a generally-rectangular moulded polymer frame having a top edge, a bottom edge and two side edges defining therebetween a central rectangular through opening, the frame further having an outer face and an inner face, and the through opening extends through both the outer face and the inner face wherein:
   the side edges of the frame each have an integrally-moulded outside part in the foam of a generally U-shaped profile that is open in the direction of the frame's outer face and has at or towards its outside an upstanding longitudinal side wall,
   the top, bottom, and side edges of the frame have an inner periphery defining an integrally-moulded flared skirt that widens towards the inner face of the frame,
   the side walls extending along the respective side edge whereby adjacent side-by-side elements can be placed with their adjacent side walls in facing relationship,
   the top edge and the bottom edge of the frame are so configured that the elements can be placed on a pitched roof with the top edge of one element against the bottom edge of an adjacent element that is placed above and in extension of said one element,
   with these top and bottom edges overlapping or interengaging with one another, and
   each roof element is arranged so that when a plurality of the elements are integrated in a pitched roof with the side walls of adjacent side-by-side elements in facing relationship and with the top and bottom edges respectively of adjacent lower and upper elements overlapping or interengaging with one another, the elements can be mounted on the roof by means of fitting brackets engaging with the side walls of the elements, to form a generally planar solar panel array from which anyone of the elements can be dismounted and reinstalled without interfering with the in-place mounting of the other elements of the array; and
   a rectangular photovoltaic or solar thermal panel fitted in the frame by adhesive bonding of the edges of the panel to the inner periphery of the outside of the frame.

2. The arrangement of claim 1, wherein the top and bottom edges are arranged such that the bottom edge of an upper element fits in overlapping relationship over the top edge of an adjacent lower element, the bottom and top edges having apertures and/or profiles that form an air passage or passages allowing the upflow of air from under the lower element to under the upper element.

3. The arrangement of claim 1, wherein the top, bottom and side edges of the frame have an open honeycomb-like structure that opens into the inner face of the frame, this honeycomb-like structure being defined by a plurality of integrally-moulded ribs that extend towards the open inner face of the frame's edges.

4. The arrangement of claim 1, wherein the generally U-shaped profile has a bottom and wherein the bottom of the generally U-shaped profile in each side edge of the frame has a series of angulated steps along its length.

5. The arrangement of claim 1, wherein each side edge of the frame has, on its inner face adjacent to the bottom edge, an integrally-moulded projection for engaging against a roof batten to position the roof element relative to the roof batten.

6. The arrangement of claim 1, in combination with at least one elongated strip-like profile that is/are adapted to engage with top parts of adjacent side walls of adjacent side-by-side elements, when the side walls are in facing relationship, to form a substantially water-tight closure between the adjacent side-by-side elements.

7. The arrangement of claim 1, in combination with brackets adapted to fit between and grip the adjacent side walls of adjacent side-by-side elements, when the side walls are in facing relationship, each bracket having an aperture for receiving an attachment member to attach the bracket to a roof.

8. An array of solar-panel roof elements according to claim 1 mounted on a pitched roof with the side walls of adjacent side-by-side elements in facing relationship, and secured to the roof by brackets engaging the adjacent side walls of the adjacent side-by-side roof elements.

9. The array of solar-panel roof elements of claim 8, wherein at least one elongated strip-like profile fits over top parts of the adjacent side walls of adjacent side-by-side elements that are in facing relationship, one or more of said strip-like profiles extending along all elements from top to bottom of the array to form a substantially water-tight closure between the adjacent side-by-side elements, leaving open the U-shaped profiles that form rain drainage channels extending from top to bottom of the array.

10. The array of solar-panel roof elements of claim 8, wherein the outermost side edges of elements located at the outside of the array are held on the roof by brackets that engage with the outermost side walls and extend under an adjacent roof covering.

11. The array of solar-panel roof elements of claim 10, wherein one or more flashing elements extend from under the roof covering to engage with the outermost side walls, the uppermost top edge(s) and the lowermost bottom edge(s) of the elements.

12. A roofing arrangement including a building-integrated solar-panel roof element adapted to be fitted with a solar panel and integrated in a pitched roof and at least one elongated strip-like profile, the roof element comprising:

a generally-rectangular moulded polymer frame having a top edge, a bottom edge and two side edges defining therebetween a central rectangular through opening, the frame further having an outer face and an inner face, and the through opening extends through both the outer face and the inner face wherein:

the side edges of the frame each have an integrally-moulded outside part in the form of a generally U-shaped profile that is open in the direction of the frame's outer face and has at or towards its outside an upstanding longitudinal side wall, the side walls extending along the respective side edge whereby adjacent side-by-side elements can be placed with their adjacent side walls in facing relationship, the top edge and the bottom edge of the frame are so configured that the elements can be placed on a pitched roof with the top edge of one element against the bottom edge of an adjacent element that is placed above and in extension of said one element, with these top and bottom edges overlapping or interengaging with one another, and each roof element is arranged so that when a plurality of the elements each fitted with a solar panel are integrated in a pitched roof with the side walls of adjacent side-by-side elements in facing relationship and with the top and bottom, edges respectively of adjacent lower and upper elements overlapping or interengaging with one another, the elements can be mounted on the roof by means of fitting brackets engaging with the side walls of the elements, to form a generally planar solar panel array from which anyone of the elements can be dismounted and reinstalled without interfering with the in-place mounting of the other elements of the array;

wherein the at least one elongated strip-like profile is adapted to engage with top parts of adjacent side walls of adjacent side-by-side elements, when the side walls are in facing relationship, to foam a substantially water-tight closure between the adjacent side-by-side elements.

13. A roofing arrangement including a building-integrated solar-panel roof element adapted to be fitted with a solar panel and integrated in a pitched roof and at least one bracket, the roof element comprising:

a generally-rectangular moulded polymer frame having a top edge, a bottom edge and two side edges defining therebetween a central rectangular through opening, the frame further having an outer face and an inner face, and the through opening extends through both the outer face and the inner face wherein:

the side edges of the frame each have an integrally-moulded outside part in the form of a generally U-shaped profile that is open in the direction of the frame's outer face and has at or towards its outside an upstanding longitudinal side wall, the side walls extending along the respective side edge whereby adjacent side-by-side elements can be placed with their adjacent side walls in facing relationship, the top edge and the bottom edge of the frame are so configured that the elements can be placed on a pitched roof with the top edge of one element against the bottom edge of an adjacent element that is placed above and in extension of said one element, with these top and bottom edges overlapping or interengaging with one another, and each roof element is arranged so that when a plurality of the elements each fitted with a solar panel are integrated in a pitched roof with the side walls of adjacent side-by-side elements in facing relationship and with the top and bottom edges respectively of adjacent lower and upper elements overlapping or interengaging with one another, the elements can be mounted on the roof by means of the at least one bracket engaging with the side walls of the elements, to form a generally planar solar panel array from which anyone of the elements can be dismounted and reinstalled without interfering with the in-place mounting of the other elements of the array;

wherein the at least one bracket is adapted to fit between and grip the adjacent side walls of adjacent side-by-side elements, when the side walls are in facing relationship, each bracket having an aperture for receiving an attachment member to attach the bracket to a roof.

14. The arrangement of claim 13, wherein the top, bottom, and side edges of the frame have an inner periphery defining an integrally-moulded flared skirt that widens towards the inner face of the frame.

15. The arrangement of claim 14, wherein the inner periphery of the edges of the frame has at least one aperture for allowing a passage to wires, cables and/or tubing.

16. The arrangement of claim 14, wherein there is an integrally-moulded recessed channel and a ledge located around the inner periphery of the outer face of the frame, for receiving an edge of a solar panel of corresponding dimensions to fit the solar panel in the frame.

17. The arrangement of claim 14, further comprising a rectangular photovoltaic or solar thermal panel fitted in the frame by adhesive bonding of the edges of the panel to the inner periphery of the outside of the frame.

* * * * *